United States Patent [19]
Chang et al.

[11] Patent Number: 5,393,371
[45] Date of Patent: * Feb. 28, 1995

[54] INTEGRATED OPTICS CHIPS AND LASER ABLATION METHODS FOR ATTACHMENT OF OPTICAL FIBERS THERETO FOR LINBO3 SUBSTRATES

[75] Inventors: Chin L. Chang; Ching F. Chen, both of Los Angeles County, Calif.

[73] Assignee: Litton Systems, Inc., Woodland Hills, Calif.

[*] Notice: The portion of the term of this patent subsequent to Sep. 10, 2008 has been disclaimed.

[21] Appl. No.: 80,996

[22] Filed: Jun. 22, 1993

Related U.S. Application Data

[63] Continuation of Ser. No. 741,384, Aug. 7, 1991, abandoned, which is a continuation-in-part of Ser. No. 451,588, Dec. 18, 1989, Pat. No. 5,046,808.

[51] Int. Cl.$^6$ .................................................. G02B 6/30
[52] U.S. Cl. ................................... 156/629; 156/643; 219/121.69; 219/121.85
[58] Field of Search ........................ 156/629, 644, 643; 219/121.69, 121.85; 385/13, 14, 49; 350/96.17, 96.11, 96.12, 96.15; 65/4.1

[56] References Cited

U.S. PATENT DOCUMENTS

| | | | |
|---|---|---|---|
| 4,598,039 | 7/1986 | Fischer et al. | 156/643 X |
| 4,838,989 | 6/1989 | Ashby et al. | 156/628 |
| 4,904,038 | 2/1990 | Chang | 350/96.14 |
| 4,976,506 | 11/1990 | Pavlath | 350/96.17 |
| 5,046,808 | 9/1991 | Chang | 385/13 |
| 5,059,763 | 10/1991 | Obrien et al. | 219/121.69 |

FOREIGN PATENT DOCUMENTS 52-72755 1/1979 Japan.
62-66191 1/1988 Japan.

OTHER PUBLICATIONS

Ashby et al., "Laser-driven Chemical Reaction for Etching LiNbO3," Applied Physics Letters, vol. 49, No. 8, Aug. 1986, pp. 475–477.
Nutt et al., "Fiber-to-Waveguide Coupling Using Ion-milled Grooves in Lithium Niobate at 1.3-um Wavelength," Optics Letters, vol. 9, No. 10, Oct. 1984.
Elliot, Integrated Circuit Fabrication Technology, McGraw-Hill, 1982, p. 282.
Photocopy Article "Excimer Laser Marks LiNbO3 for Fiber optic devices" Laser Focus World, May 1990.

*Primary Examiner*—Thi Dang
*Attorney, Agent, or Firm*—James F. Kirk; Chester E. Martine, Jr.

[57] ABSTRACT

An integrated optics device has a substrate of lithium niobate (LiNbO3) with at least one optical waveguide. A slot formed in the edge of the substrate has end wall that exposes an end surface of the optical waveguide formed at an end surface angle with the optical axis of propagation to reduce reflected light in the optical waveguide. A length of optical fiber. The optical fiber has an end face formed at an end face angle with the direction of the propagation of light in the optical fiber. The slot is formed to receive the optical fiber. The optical fiber is positioned in the slot with the end face butt-coupled to the end surface of the optical waveguide to form an interface such that light may propagate between the optical waveguide and the optical fiber. A means for mounting the substrate. The optical waveguide is extended to an input junction with a center wave guide and with an sense waveguide. A first and second barrier trench or channel is formed adjacent to and substantially parallel with the center waveguide and offset from the waveguide by a predetermined distance. A portion of optical waveguide extending from the slot to the input junction is doped with a rare earth ion suitable for use as a light source when end pumped by light from the end face. The length of sense waveguides is selected to be greater than the coherence interval of the light source.

22 Claims, 9 Drawing Sheets

INTEGRATED OPTICS CHIPS AND LASER ABLATION METHODS FOR ATTACHMENT OF OPTICAL FIBERS THERETO FOR LINBO₃ SUBSTRATES

This is a continuation of application Ser. No. 07/741,384, filed on Aug. 7, 1991, now abondoned.

BACKGROUND OF INVENTION

This invention relates to the field of integrated optic chips or devices and more particularly to the field of processes relating to the attachment of optical fibers to the chips for use in making integrated optic circuits on lithium niobate ($LiNbO_3$) substrates such as those used for the fabrication of interferometer type instruments such as fiber optic gyros and Mach-Zehnder interferometers.

The invention and method in this application is a continuation application of continuation in part application Ser. No. 07/741,384 filed Aug. 7, 1991, now abandoned, which was a continuation-in-part application to prior U.S. patent application Ser. No. 07/451,588 filed Dec. 18, 1989 for an Integrated Optics Chip and Method of Connecting Optical Fiber Thereto. The '588' patent application issued into U.S. Pat. No. 5,046,808 on Sep. 1, 1991, has a common assignee and teaches eliminating back reflection in fiber optic rotation sensors by establishing an angle at the end of an optical waveguide in the range of 5–25 degrees with the axis of a fiber to be joined therein to permit refraction from the core into the cladding. The '80' patent also teaches the step of forming the end of the trench to make a predetermined angle with the optical axis of the waveguide terminating on the surface of the end of the trench.

RELATED ART

The invention process in this application is also related to the innovations disclosed in U.S. patent application Ser. No. 07/702,140 filed May 13, 1991, now abandoned, as a continuation-in-part application of Ser. No. 07/428,174, filed Oct. 27, 1989, now abandoned; for a Process For Making Multifunction Integrated Optics Chips Having High Electro-optic Coefficients, and having a common assignee. The subject matter in that application disclosed a process for making waveguides that have extended performance properties and long life in a lithium niobate substrate by a proton exchange process. The contents of the "40" application are incorporated herein by reference.

The segments of optical waveguides to be formed are first delineated on the surface of a lithium niobate wafer by conventional photo-lithographic methods. The exposed segments of the masked surface of the wafer are then submerged in benzoic acid for a predetermined period of time to achieve the desired proton exchange into the exposed lithium niobate surface through the mask.

In addition to describing the step of proton exchange to form a waveguide, the '40' application explains the step of controlling the depth of a waveguide formed in the substrate, by controlling the time allowed for annealing. The depth of the guide is controlled to maximize the coupling between the waveguide in the wafer and the core of the optical fiber that is to be joined to the waveguide. The annealing process is carried out until the spot size of the light emerging from the core corresponds to the exposed waveguide interface on the surface of the wafer opposing the end of the fiber.

The invention process in this application is also related to U.S. Pat. No. 4,976,506 filed Feb. 13, 1989 for Methods For Rugged Attachment of Fibers To Integrated Optics Chips and Product Thereof. The '506' patent has a common assignee and teaches eliminating the steps of coating the jacket of a fiber optic fiber with a weldable material for attachment to an optical waveguide in a substrate. The top layer and bottom layer of the substrate are then covered with layers of weldable material. The waveguide extends to the outer edge of the guide. The end of the fiber is then positioned against the edge of the sandwiched substrate to place the core of the fiber optic fiber against the end of the wave guide. The outer periphery of the metal or glass coating on the end of the fiber is then symmetrically tack welded to the top and bottom cover layers forming the sandwich on the substrate.

Neither the '40' application nor the '506' nor the 808 patents application teach the feature of positioning the end face of the optical fiber to make an angle with the optical axis of the optical fiber. None of these related applications teach the step of using an Excimer laser to illuminate a mask to form a defined beam with a predetermined perimeter; passing the defined beam through reduction optics to form a reduced pattern beam that is focused on the substrate to expose a predetermined pattern on the substrate; and ablating at least one trench or groove with predetermined dimensions established by the reduced pattern of the beam. None of these related applications teach the step of providing a damper or suppressor for acoustic wave energy in the substrate.

Neither the '140' application nor the '808' application teach the steps of using a laser beam at a particular predetermined frequency that is specifically selected to correspond with the energy required to destroy the crystal structure, such as the crystal structure of a lithium niobate crystal without melting the substrate material.

Reactive ion etching (RIE) and fusion etching are alternative methods that are much slower methods than the invention method. Reactive ion etching is described by David J. Elliot in "Integrated Circuit Fabrication Technology" at page 282; published by McGraw-Hill, 1982. RIE involves accelerating ions and directing them to the substrate material where the ions etch the substrate by both physically displacing the substrate material and by chemical reactions.

U.S. Letters Patent No. 4,838,989 dated Jun. 13, 1989, issued to Carol I. H. Ashby for a LASER DRIVEN FUSION ETCHING PROCESS, described a chemically aided laser etching process called fusion etching which may be slightly faster than RIE but which remains much slower than the invention method of ablation etching. The process of the '989' patent used an Excimer Laser delivering pulses at a workpiece surface coated with a solid layer of material such as KF. The substrate material workpiece surface was raised in temperature by the laser beam producing localized melting of the $LiNbO3$ by high power density laser pulses with photon energies in excess of the band gap of $LiNbO3$ (i.e. 4.0 eV, 310 nm). The rise in temperature produces a fusion reaction between the KF coating and the $LiNbO3$ substrate surface. The $LiNbO3$ molten by the laser reacts with the KF to form complex niobium oxyfluoride anions. The resulting solid is highly soluble in water, whereas $LiNbO3$ is insoluble in water. The resulting solid is removed from the surface by rinsing in water.

Use of laser driven fusion to etch lithium niobate is also disclosed by Ashby et al., in Appl. Phys. Lett. 49 (8), Aug. 25, 1986, pp 475–477 which is incorporated herein by reference along with the disclosure of U.S. Pat. Nos. 4,838,989; 4,976,506 and U.S. application Ser. No. 07/428,174 discussed above.

The '989' patent characterized a laser driven fusion etching process as useful for etching material such as Lithium Niobate; however the etching speed produced by the process of the '989' patent is too low for commercial applications.

The fusion process also lacks the ability to provide sharp delineations for channel margins since the process forms the channels by melting the material therein.

The '989' patent does not show or suggest the use of an Excimer laser for ablation etching at a wavelength of 248 nm without KF or any aqueous cover on a Lithium Niobate crystal substrate ($LiNbO_3$) to etch narrow channels in the substrate.

SUMMARY OF THE INVENTION

This invention is an integrated optics device formed on a substrate of optically active material, or electro optic material. The substrate has at least one slot formed therein to intercept a corresponding optical waveguide delineated within the substrate. The waveguide is characterized to guide optical signals along a selected optical axis of propagation.

The slot has a first end at the edge of the substrate and a second end at a distal end wall. The distal end wall of the slot exposes an end surface of the optical waveguide. The end surface of the optical waveguide is formed at an angle with the optical axis of propagation within the optical waveguide to reduce the amount of light reflected back into the optical waveguide at the end surface of the optical waveguide.

The invention also has at least one length of optical fiber with a core and cladding. The cladding is formed around the core. The optical fiber terminates at an end that is typically polished and that is referred to as an end face. The end face of the optical fiber is formed to make an angle with the direction of the propagation of light in the optical fiber to reduce the amount of light reflected back into the optical fiber at the end face of the optical fiber. The slot is formed to receive the optical fiber. The end of the optical fiber is positioned in the slot and its location fixed with the end face of the core butt-coupled to the end surface of the optical waveguide to form an interface such that light may propagate between the optical waveguide and the optical fiber. Acoustic wave energy in the substrate is suppressed.

The invention also teaches a method for making the channel trench in a lithium niobate substrate, or other crystal material having similar crystal or electroptic properties. The channel is formed to have a width very closely matched to the outside diameter of a fiber optic fiber. Alignment of the core with the optical axis of the waveguide is critical. The invention method provides a slot or trench with a predetermined depth characterized to align the central axis of the optical fiber, when positioned in the trench, to be substantially in alignment with the centrad of the end surface of the optical waveguide formed in the lithium niobate ($LiNbO_3$) substrate.

The invention method teaches the use of ablation etching in delineating and forming channels or slots with walls that are substantially normal to the surface of the substrate, the slots thus formed having predetermined dimensions and locations in a lithium niobate substrate with milling speeds not obtainable using earlier methods. The trench is formed with substantially smooth sidewalls and with an outer perimeter substantially free of debris or damage from heat. lithium niobate ($LiNbO_3$) substrates.

A first embodiment of the invention method for attaching the end of an optic fiber into a trench in a lithium niobate substrate to position the core at the center of an end surface of the fiber optic fiber against the end surface of an optical waveguide terminating at the end of the trench. The invention method begins with the steps of:

A. masking the surface of the substrate to expose a region in the flat surface of the substrate in which the channel is to be formed; the channel, having an optical axis, terminating at a distal end wall, the end wall being finished to be substantially flat and to expose a sectional surface of an optical waveguide on the end wall, the optical axis of the optical waveguide substantially intercepting the channel optical axis at the surface of the end wall;

B. ablating the material of the substrate by exposing the masked surface of the substrate to Excimer Laser pulsed energy beam, the laser beam having a wavelength predetermined to be in the range of 248 nano meters to 308 nano meters;

C. positioning the end of the fiber optic fiber into the channel, the channel having a predetermined length and depth characterized to substantially align the core optical axis with the channel optical axis;

D. adjusting the exposed core surface centrally against the exposed waveguide surface to obtain a predetermined optical coupling;

E. bonding the end of the fiber optic fiber in the recess.

In an alternative method, the channel step of masking is performed by photo-lithography. In another alternative method, the step of masking is performed by interposing an enlarged pre-prepared metal mask in the laser beam path, the laser beam passing through the mask and being reduced to a predetermined size and focused to form an image of the desired channel pattern.

In a more particular embodiment, the substrate is coated with a thin layer of metal before ablation, the metal above the channel to be formed being removed by the ablation process and the metal adjoining the channel remaining and enhancing the sharpness of the margin of channel by preventing the substrate material at the margin wall from melting.

PREFERRED EMBODIMENT

Figure 1:
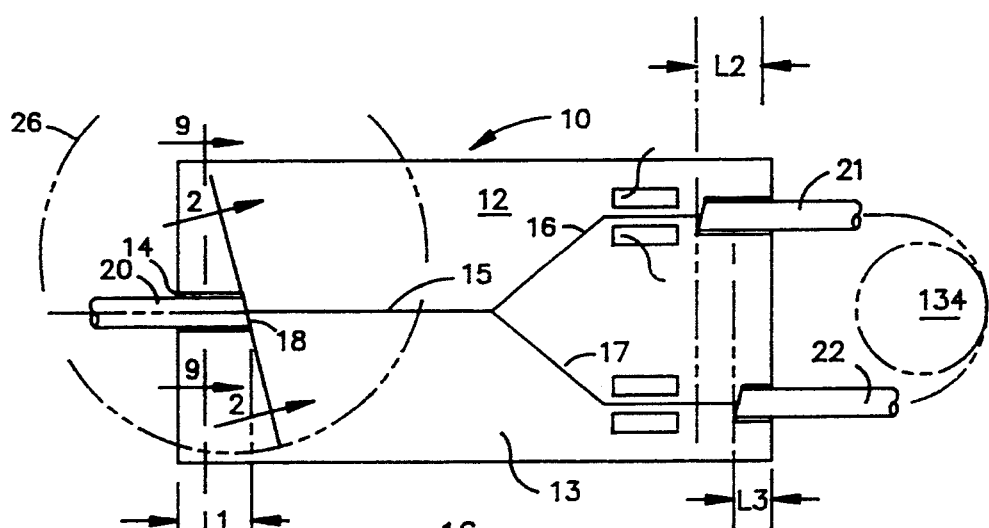
FIG. 1 is a top elevation view of an integrated optic single Y coupler formed in a substrate with three fiber optic fibers inserted into three respective channels, each fiber optic fiber extending away from the integrated optic substrate.

FIG. 1 shows an integrated optics device 10 comprising a wafer or substrate 12 typically of optically active material such as single crystal Lithium Niobate (LiNbO$_3$) for use in an integrated electro-optic Y shaped coupler and or modulator. The substrate 12 has a top surface 13 with a notch or slot 14 and at least one optical waveguide 15 delineated or formed therein. First, second and third optical waveguides 15, 16 and 17 are formed within the substrate to guide optical signals along a selected path or optical axis of propagation. The slot 14 has an end wall 18 located at the end of the slot. Base surface 19 is shown under the top surface. In the Y-Coupler and modulator configuration of FIG. 1, a first optical fiber 20 would typically source optical signals first optical waveguide 15. Second and third optical fibers 21, 22 would receive optical signals from second and third optical waveguides 16 and 17 respectively.

Figure 2:
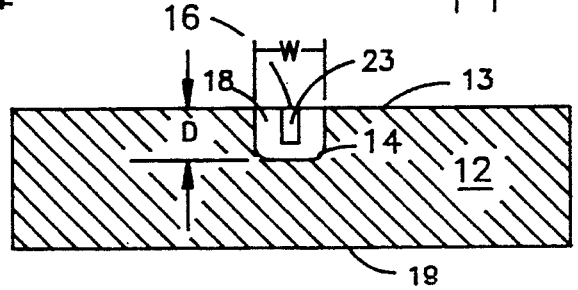
FIG. 2 is a sectional view of FIG. 1 taken on section line 2—2 at the right-most end of a channel to show the end wall of the channel with the end surface of an optical waveguide outlined thereon.

FIG. 2 is a sectional view taken on section line 2—2 of FIG. 1 that shows end wall 18 of the slot 14 having width "W". End wall 18 contains end surface 23 of the optical waveguide 15.

The first, second and third optical waveguides 15, 16 and 17 may be formed to be substantially identical in cross section. The description of the first optical waveguide 15 applies also to the second and third optical waveguides 16 and 17. First waveguide 15 may be generally rectangular in cross section, but has corners inside the substrate 12 that may be somewhat rounded. The cross sectional area of the first waveguide 15 at the end surface 23 of the optical waveguide 20, is preferably about the same as the cross sectional area of the core 24 (shown in FIGS. 3 and 4) to provide efficient coupling of light between the first waveguide 15 and the first optical fiber 20.

Figure 3:
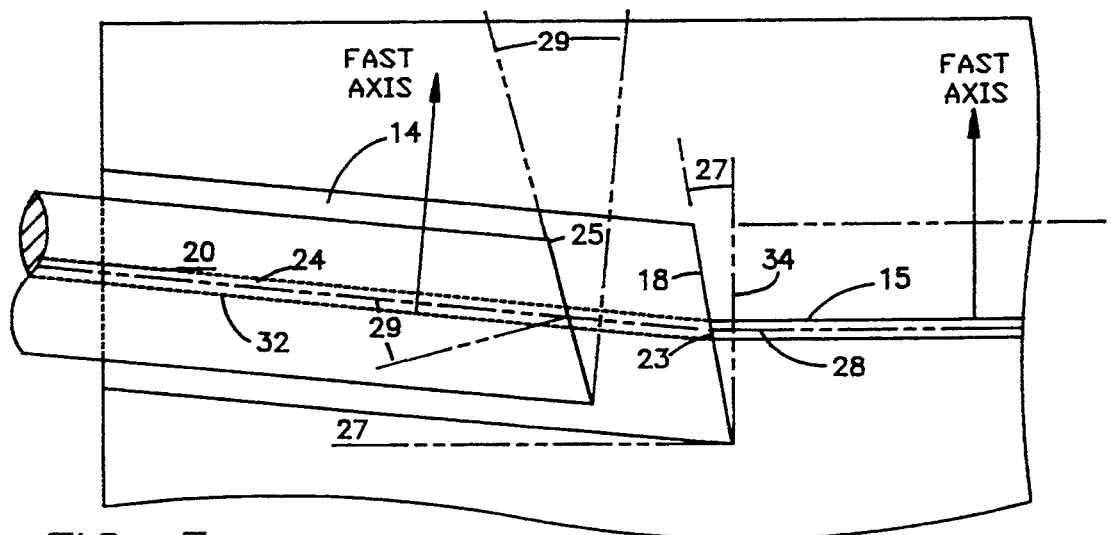
FIG. 3 is a schematic representation of the area within the phantom circle of FIG. 1, with a fiber optic fiber residing in a channel, the clearances being exagerated, the end of the fiber being retracted from the end wall of the channel to permit a graphic depiction of the end face angle of the optical fiber and the end surface angle of the optical waveguide.
Figure 4:
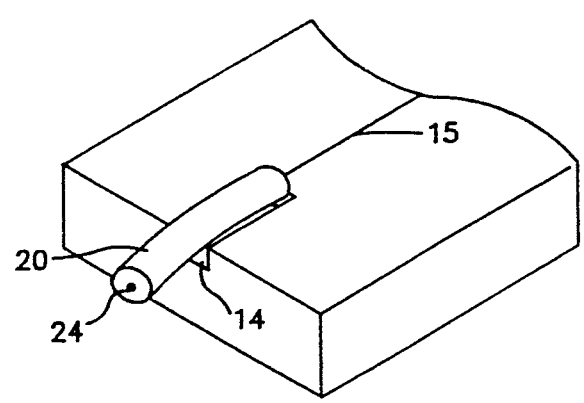
FIG. 4 is an perspective view of the fiber optic fiber, substrate and channel within the phantom circle in FIG. 1.

The integrated optics device of FIGS. 1 and 2 might typically be an MIOC (Multifunction Integrated Optics Chip) and as such would have electrical leads connected to metalized areas flanking second and third optical waveguides 16 and 17 on the top surface 13. By way of example, a typical MIOC is approximately 40 mm in length and 2 mm in width. The trench 14, is formed to have a typical length L of 15 mm. The width W of the trench is typically in the range of 80 um to 125 um, depending on the diameter of the optical fiber to be used. The depth of the trench D is typically in the range of 40 to 70 um. Referring to FIGS. 2, 3 and 4, the depth of the trench D is predetermined to align the center of the core 24 on the end face 25 of the first optical fiber 20 with the center of the end surface of the first optical waveguide 15. With a width W of 80 um, the depth of the trench D is typically set to a value equal to half of the diameter of the first optical fiber 20 plus an added amount equal to the diameter of the core.

FIG. 3 is a an enlarged view of the region within phantom circle 26 that shows that the end surface 23 of the first optical waveguide 15 is formed at an end surface angle 27 of 10 degrees with respect to a normal 34 to optical axis of propagation 28 to reduce the amount of light reflected at the end surface 23 of the first optical waveguide 15.

Referring again to FIG. 3, the optical fiber 20 is shown partially inserted into slot 14. A gap exists between the end face 25 of the first optical fiber 20 and the end surface 23 of the first optical waveguide 15 only to permit a clear depiction of the end face angle 29 of the first optical waveguide 15.

Figure 8:
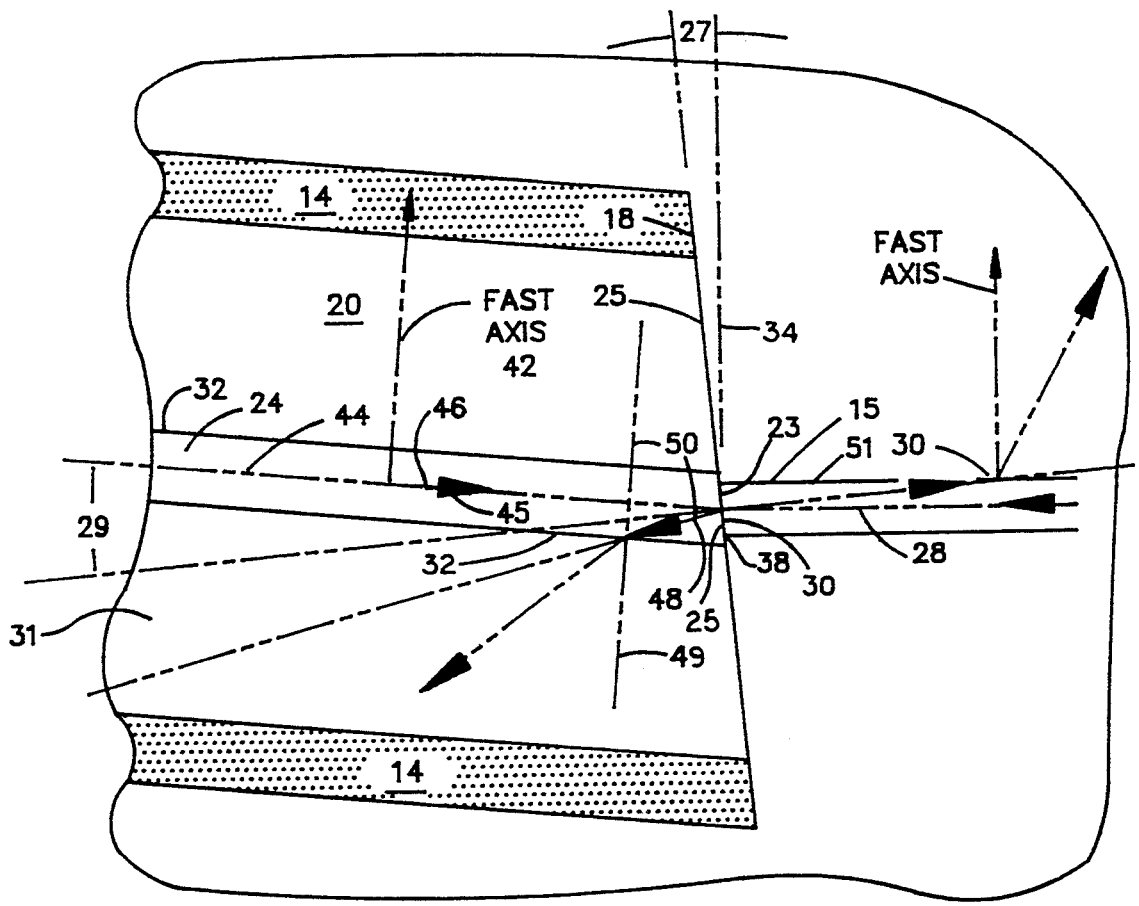
FIG. 8 is an expanded elevation view of the area within the phantom circle of FIG. 1, with a fiber optic fiber residing in a channel, the clearances being exaggerated, the end of the fiber being abutted against the end wall of the channel and showing the end face angle of the optical fiber and the end surface angle of the optical waveguide.

FIGS. 3 and 8 show that the end wall 18 of the slot 14 exposes the co-planar end surface 23 of the first optical waveguide 15. The end wall 18 of the slot 14 is formed at the end surface angle 27 of the first optical waveguide 15 with respect to a normal 34 with the optical axis of propagation 28, i.e. the direction of the propagation of light in the first optical waveguide 15 such that light traveling in the first optical waveguide 15 to the end surface 23 of the optical waveguide 15 that is reflected back into the first optical waveguide 15 is deflected and impinges on the waveguide substrate boundary 30 shown in FIG. 8, at an angle that permits refraction from the first optical waveguide 15 into the substrate 12 thereby allowing the substrate 12 to absorb and eliminate the reflected light.

Figure 6:
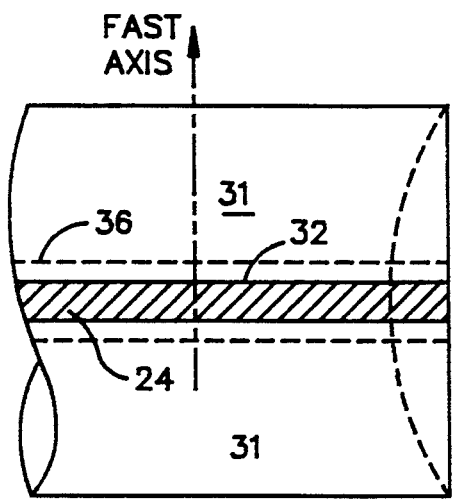
FIG. 6 is a sectional view of the fiber optic fiber in FIG. 5 taken on section line 6—6.

The end face 25 of the optical fiber 20 is formed to make an angle with the direction of the propagation of light such that light traveling in the first optical fiber 20 to the end face 25 of the first optical fiber 20, that is reflected back into the first optical fiber 20 that is deflected and impinges on the cladding 31 at the core cladding boundary 32 shown in FIGS. 6 and 8 at an angle that permits refraction from the core 24 into the cladding 31 thereby allowing the cladding 31 to absorb and eliminate the reflected light.

As depicted in FIGS. 1, 3, 4 and 8, the integrated optics device 10 has at least 1 length of optical fiber, i.e. first optical fiber 20. FIG. 4 shows the left portion of the integrated optics device 10 in a perspective view in which the first optical fiber 20 is positioned in slot 14.

Figure 5:
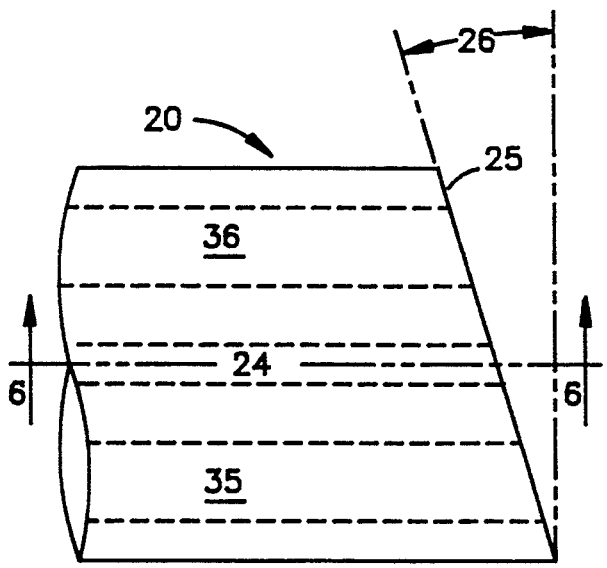
FIG. 5 is a top elevation view of the left most fiber optic fiber in FIG. 1.

FIG. 5 is a top-elevation view of a portion of the end of the first optical fiber 20 in FIG. 1 with first and second stress rods 35, 36 and core 24 shown in phantom.

FIG. 6 is a sectional view of the first optical fiber 20 in FIG. 5 taken on section line 6—6 to show the core 24 with cladding 31 around the core and with second stress rod 36 in phantom, in the background.

Figure 7:
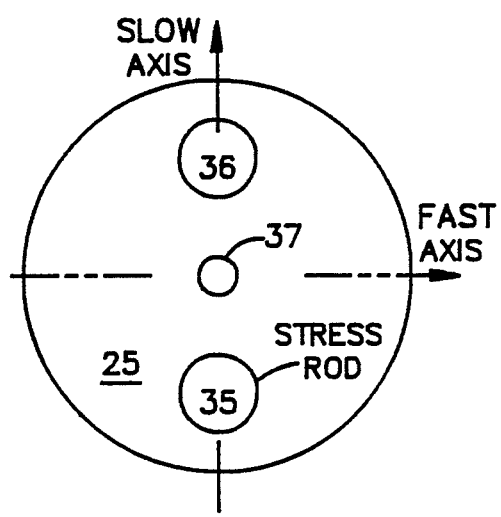
FIG. 7 is a right elevation view of the end face of the optical fiber in FIG. 5.

FIG. 7 is a right-elevation view of the optical fiber of FIG. 5 showing the end-face 25 of the first optical fiber 20. The fiber shown is one example of a polarization maintaining fiber. The cross section shown is referred to as a Panda Cross Sectional Design and is available from Fujikura of Tokyo, Japan. Hatachi provides a fiber with an elliptical cross section that is polarization maintaining.

FIG. 8 shows the first optical fiber 20 positioned in the slot 14 with the end face 25 of the first optical fiber 20 butt-coupled to the end surface 23 of the first optical waveguide 15 to form an interface 38 such that light may propagate between the first optical waveguide 15 and the first optical fiber 20 efficiently through the interface 38. The end face angle 29 of the first optical fiber 20 is the angle of incidence for light moving through the optical core towards the end face 25 of the first optical fiber 20. The end face angle 29 of the first optical fiber 20 is measured in a plane containing the fast axis 42 and the optical axis 44 of the optical fiber.

A portion of transmitted light, represented by first ray 46 moving through the core 24 of the first optical fiber 20 towards the end face 25 of the first optical fiber is reflected as reflected second ray 48. The reflected second ray 48 propagates and intercepts the cladding 31 with a cladding angle of incidence 50. The cladding angle of incidence 50 is equal to the angle formed between the reflected second ray 48 and the normal 49 to the optical axis 44. The end face angle 29 of the optical fiber 29 is adjusted to reduce the cladding angle of incidence 50 until the critical angle is reached and all of the reflected light in reflected second ray 48 escapes from the core 24 into the cladding 31 at the core cladding boundary 32.

Referring to FIG. 8, if light is moving from the waveguide to the interface 38 most of the reflected light will then strike the waveguide substrate boundary 51 at an angle less than the critical angle for total internal reflection and will therefore refract out of the waveguide into the substrate 12. Surface irregularities at the interface will scatter some of the light back into the waveguide at an angle such that the waveguide will guide a small portion of the scattered light. However, having the light incident upon the interface 38 at an angle of 10° to 15° reduces the reflected light by about 60 dB.

FIG. 8 shows an end face angle 29 of the first optical fiber 20, of approximately ten degrees. Tests have shown that an end face angle 29 of ten degrees is sufficient to provide for substantial absorption of reflections from the end face 25 of the optical fiber 20. It is believed that acceptable operation can be obtained if the end face angle 29 of the first optical fiber 20 is formed to be in the range of ten degrees to fifteen degrees with respect to the optical axis of the optical fiber.

The end surface angle 27 of the first optical waveguide 15 is determined using Snell's Law. For normal incidence upon the interface 38, i.e. for the arrangement in which the optical axis of the optical fiber 44 is in alignment with the optical axis of the waveguide 15, the reflection coefficient R is:

$$R = \left| \frac{n_2 - n_1}{n_2 + n_1} \right|^2 = \left| \frac{2.2 - 1.45}{2.2 + 1.45} \right|^2 = 0.04$$

This result for R means that about 4% of the incident light moving from the first optical fiber 20 to the waveguide 15 would be reflected back into the first optical fiber 20 if the axis of the first optical fiber 20 were to be aligned with the optical axis of the first waveguide 15. If the first optical fiber 20 represents the end portion of a sensing coil, such as the roll or first rotation sensing coil 134 in FIG. 13, the counter-propagating signals traversing the first rotation sensing coil 134 and striking an interface such as 38, would produce reflected light, back into the optical fiber sensing coil 134 that will mix the clockwise and counterclockwise waves and causes serious errors in the output of optical fiber rotation sensing systems.

To minimize the amount of reflected light that remains in the first rotation sensing coil 134, the slots are formed so that the light is incident upon the optical interface such as the interface 38 at an angle of 10° to 15° as shown in FIGS. 3 and 8. FIG. 8 shows that the end of the end face 25 of first optical fiber 20 and the waveguide 15 are butt-coupled so that the optical axis of the optical fiber 44 is substantially aligned with the optical axis of propagation 28 of the first waveguide 15.

By way of example, with the end face angle 29 of the first optical fiber 20 established as 10°, with the index of refraction of the core 24 of the first optical fiber 20 known to be typically 1.45 and with the refraction index of the optical wave guide known to be typically 2.2, Snell's Law is solved for the one remaining unknown, i.e. the end surface angle 27 of the first optical waveguide 15 of approximately 15 degrees. It is believed that acceptable operation can be obtained with the end surface 23 of the optical waveguide 15 formed to have an end surface angle 27 in the range of 5 degrees to 25 degrees with respect to the optical axis of the optical waveguide 15.

However, the birefringence of the waveguides and the optical fibers presents additional difficulties that the present invention overcomes. The optical signals have two orthogonal linear polarization components. Birefringence causes the two polarization components to have slightly different propagation velocities. Previous attempts to construct optical fiber rotation sensors such as the triax fiber optic gyros in FIG. 13 have involves aligning the axis of birefringence of the first rotation sensing coil 134 with those of the waveguides, such as the second and third optical waveguides 16 and 17 in FIG. 1. Misalignment of the axes of the fiber and the waveguides to which it is butt-coupled cause both polarizations in the fiber to have components along both axes in the waveguide. Similarly, both polarizations in the waveguide have components along both axes in the fiber. Therefore, whenever the light signals cross the fiber/waveguide interface 38, there is a significant cross-coupling of the two polarizations. In previous systems this polarization cross-coupling causes sinusoidally varying bias errors that cannot be corrected.

The optical signal source used in a typical optical fiber rotation sensing system is a broadband device that outputs optical signals having a coherence length $L_{coh}$ of about 50 μm. Since the waveguides are birefringent, the two polarization components will become decorrelated such that there is no discernible relationship between a polarization component along one of the axes and a polarization component along the other axis. The distance required for the polarization components to decorrelate is the depolarization length.

Aligning the axes of birefringence is very labor intensive and therefore, expensive. It has been found to be impossible to align the fiber axes and the waveguide axes sufficiently close to eliminate polarization cross-coupling.

Referring again to FIG. 1, the present invention overcomes the difficulty of polarization cross-coupling without placing stringent requirements on the alignment of the axes of birefringence of the second and third optical waveguides 16 and 17 with those of the ends 21 and 22 of the optical fiber sensing coil 134 shown in phantom. The difference of the lengths of the second and third waveguides 16 and 17 (L2-L3) is formed to be greater than the depolarization length. The difference of the lengths of the second and third waveguides 16 and 17 causes an asymmetry in the polarization cross-coupling. Having this asymmetry in the polarization cross-coupling reduces the error caused by the cross-coupling.

Both the reactive ion etch and laser driven fusion techniques and the ablation etching method produce mirror quality end facets at angles of 10° to 15° on the edges of the integrated optics chip 10 as desired for preventing an excessive amount of light from reflecting back into the sensing coil at the waveguide/fiber interfaces such as interface 38. Techniques previously used for forming coupling grooves involved polishing the edges of the substrate so that an optical fiber may be coupled to a waveguide in the integrated optics chip.

Figure 9:
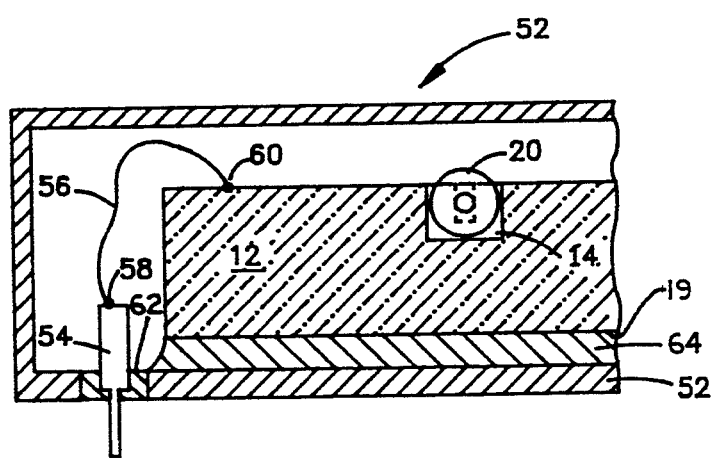
FIG. 9 is a schematic sectional view of the substrate 12 and optical fiber 20 on section line 9—9 in FIG. 1, the sectioned view being depicted within a sectioned mounting package.

FIG. 9 schematically characterizes a means for mounting the substrate 12 as comprising a metal can 52 with through pins 54 for making contact with circuitry on a printed circuit board (not shown). Through pin 54 is electrically isolated from metal can 52. The metal can 52 contains the substrate 12 with an optical fiber, such as first optical first 20 residing in slot 14. A conventional flying lead 56 is shown making an electrical connection between a pin terminal 58 at the top of the through pin 54 and an electrical pad 60 on the top of substrate 12. The substrate 12 is coupled to the lower inside surface 62 of the metal can 52 or package via an adhesive layer 64 that represents a means for acoustically damping the substrate 12. In practice, the adhesive layer completely encapsulates the substrate 12 covering all surfaces including the top surface 13.

The adhesive layer 64 is applied to the base or bottom surface 19 of the substrate 12 or positioned between the base surface 19 of the substrate and the lower inside surface of the metal can 52 or package. A mixture of brown polyurethane and tungsten powder is used as adhesive layer 64. The tungsten powder in the range of 25% to 46% by volume function well as an adhesive layer 64 and as a means for acoustically damping the substrate 12.

METHOD OF MAKING

FIG. 10a–10e is a flow diagram of front views that shows the steps in a method for making an integrated optics device 10 that has a substrate 12, with waveguides preformed therein, the integrated optics device being formed of an optically active material with a slot 14 formed therein. The integrated optics device 10 has at least one or first optical waveguide 15 delineated within the substrate 12 to guide optical signals along a selected optical axis of propagation. The slot 14 has a distal end wall 18. The end wall 18 of the slot exposes an end surface 23 of the first optical waveguide 15. The end surface of the optical waveguide is formed at an end surface angle 27 with the optical axis of propagation to reduce the amount of light reflected from the end surface 23 of the first optical waveguide 15 back into the first optical waveguide 15. In a first embodiment, the invention method includes the steps of:

A. Using an Excimer Laser micro machining system from companies such as Lumonics Inc. at 105 Schneider Rd., Kanata, Ontario, Canada K2K1Y3 or from Image Microsystems, Inc. at 900 Middlesex Turnpike, Building 8, Billerica, Mass. 01821 for micro machining a channel of predetermined length, depth and width into the surface of the crystal substrate 12 formed from lithium niobate (LiNbO$_3$) substrate by scanning the surface path of the channel to be micro machined with a focused beam of photons.

Figure 10A:
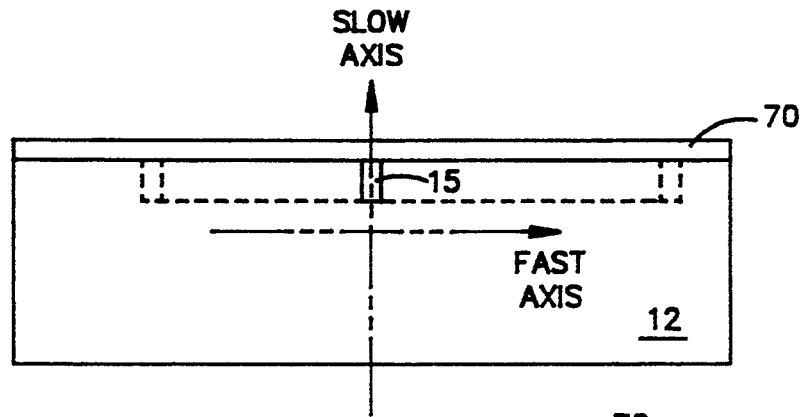
FIGS. 10a–10e is a block diagram of the Micro Machining System used for the invention process.

FIG. 10a shows that the lithium niobate substrate 12 initially has a thin layer of metal 70 applied to its top surface before starting the etching process. The Excimer Laser will be discussed later in connection with FIG. 11.

Figure 14:
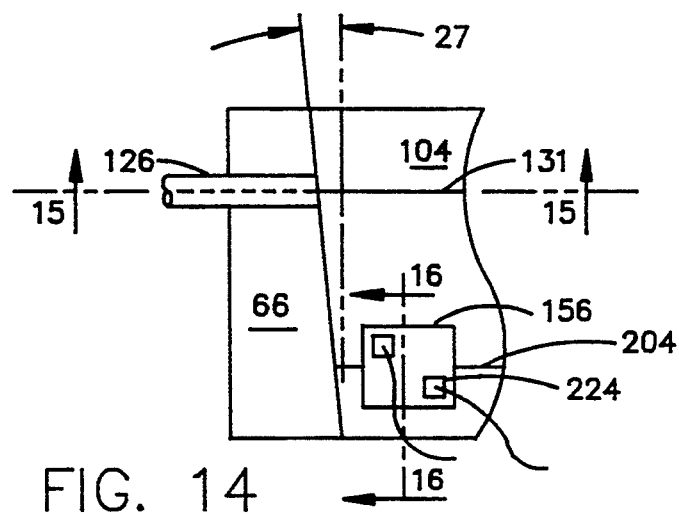
FIG. 14 is a plan view of the input end of an MIOC such as MIOC1 modified to show an exagerated fiber mounted on a ledge and aligned to abut the end of the optical fiber core against waveguide.
Figure 16:
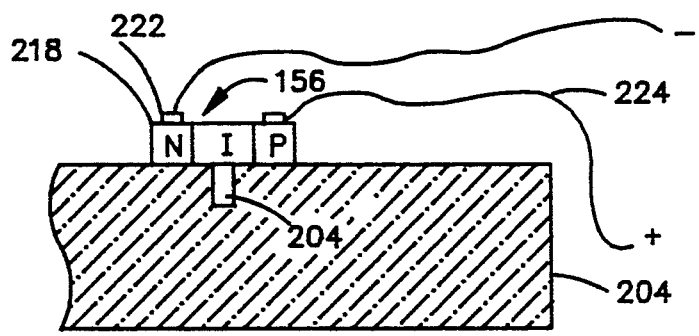
FIG. 16 is a partial sectional view of FIG. 14 taken on section line 16—16 in FIG. 14 a surface mounted detector.
Figure 17:
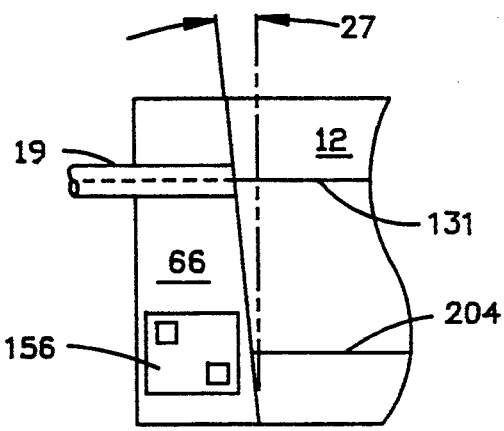
FIG. 17 shows an alternative mounting arrangement for the detector shown in FIG. 14.

FIGS. 14 and 17 are respective plan views of the substrate 12 that illustrate the channel or slot 14, shown in FIGS. 1 and 8, can preferably be formed as a ledge 66 along the edge of the substrate instead of as a channel. FIG. 16 is a partial side sectional view, taken on section line 15—15, that depicts ledge 66 in section. Ledge 66 is an alternative to the slot 14 that offers the advantage of more convenient alignment of the end face of the core 24 with the end surface 23 of the first waveguide 15.

The wavelength of the photons or light is in the near ultra violet range. The beam density and beam frequency is selected to avoid localized melting of the substrate and to ablate molecules from the crystal lattice thereby achieving sharp edges and high definition along the channel edges.

A beam wavelength of 308 nm has been found to be preferable for ablating lithium niobate (LiNbO$_3$). The micromachining process of the channel or slot 14 of FIG. 1 or 8 or the ledge 66 of FIG. 14 or 17 terminates the channel sharply that the channel end wall 18. Ablation avoids melting and other trauma to the regions of the chip on which channels are formed. The depth of the ablated channel is precisely controlled in the micro machining process to achieve alignment of the optical axis of the fiber to be placed in the channel with the optical axis of the optical waveguide. The channel end wall 18 contains the end surface 23 of the optical waveguide.

A lithium niobate (LiNbO3) single crystal looks like a cubic. The lithium ion that connects two cells acts as a spring to connect two cubics. The invention step of ablation requires that light be launched from the Excimer Laser at 248 nm or 308 nm which has sufficient energy to break the bond. Once the bond is broken, the whole crystal expands and there is no energy to hold the lithium ions in place.

The energy in each proton depends on the wavelength of the photon. The wavelength is critical to the process and must be adjusted to approximately 308 nm. The light source is adjusted to provide photons with sufficient energy to break the bond of the lithium niobate crystal.

The wavelength of the laser is adjusted to shorter values until a point is reached at which energy on a particular crystal increases to the resonant point where the crystal can no longer exist. The Excimer laser increases the energy of the crystal material to the point at which the compound is broken down into its elements as the crystal structure ceases to exist.

Figure 10B:
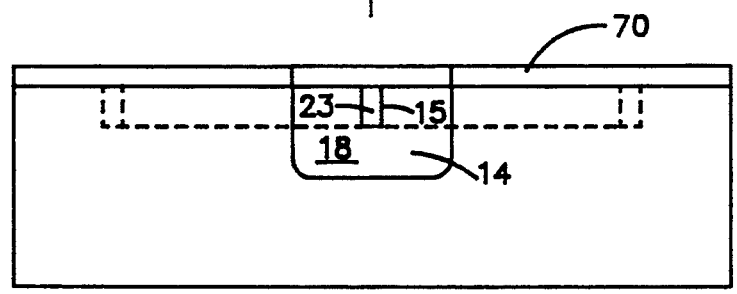

FIG. 10b shows the substrate with a channel or slot 14 formed therein by the ablation process using a mask or by direct writing.

Figure 10C:
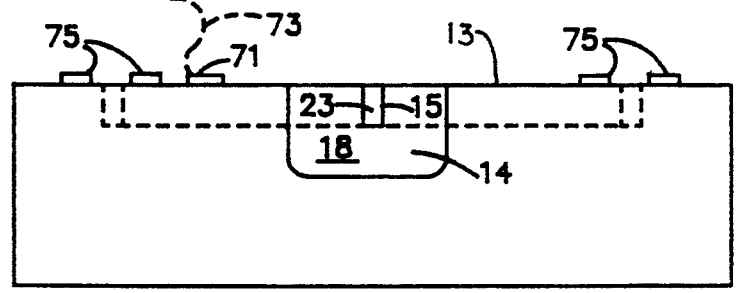

FIG. 10c shows the substrate after a layer the thin of metal has been removed leaving sites such as terminal pads 71 and modulator plates 75 or regions of metal on the top surface 13.

Figure 10D:
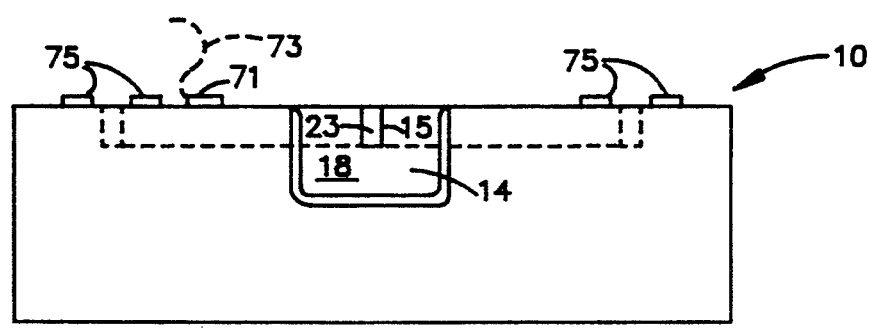

FIG. 10d shows the channel or slot 14 or ledge 66 partially filed with an optical epoxy.

B. Position the end portion of the optical fiber 20 into the channel or slot 14 or ledge 66. The channel or slot 14 or ledge 66 predetermined length and depth is characterized to coaxially align and abut the end face 25 of the core 24 with the end surface 23 of the first optical waveguide 15. Where polarization maintaining fiber is positioned in the channel of slot 14 for use in connecting an first optical signal source or receiver to optical waveguide 15, the fast axis of the optical fiber is aligned with the fast axis of the substrate 12 before the fiber is immobilized in the channel.

To achieve alignment, the end portion of the fiber is positioned in the slot 14 and rotated in the slot 14 to align the polarization axis of the optical fiber 20 with the polarization axis of the optical waveguide 15 to obtain an alignment as shown in FIG. 8.

C. The end portion of the optic fiber is then fixed into the channel with end face of the core 24 central to the end face 25 of the first optical fiber 20 substantially abutting the first waveguide 15 end surface 23.

Figure 10E:
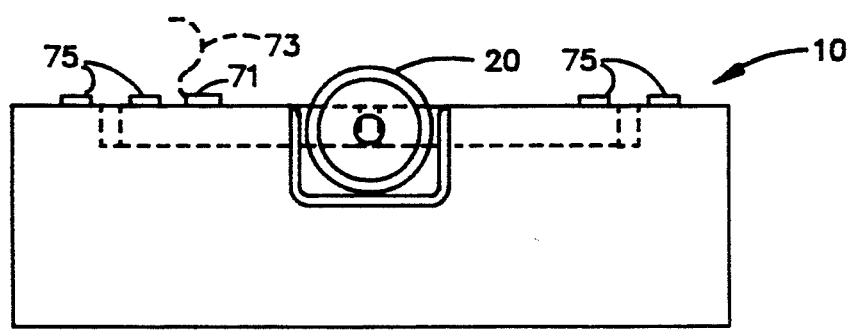

FIG. 10e shows the first optic fiber 20 imbedded in the optical epoxy to fix the fiber into the channel or slot 14 or ledge 66.

In step A above, the step of micro machining further comprises the steps of adjusting the wavelength of the photons and the spot size, pulse rate and pulse density and scan rate of the focused beam containing the photons to achieve ablation substantially free of melting of the crystal substrate to the predetermined depth along the predetermined path of the channel or slot to be formed. As stated, a wavelength of 308 nm has been determined to achieve ablation without melting when processing substrates of lithium niobate (LiNbO3).

Figure 12A:
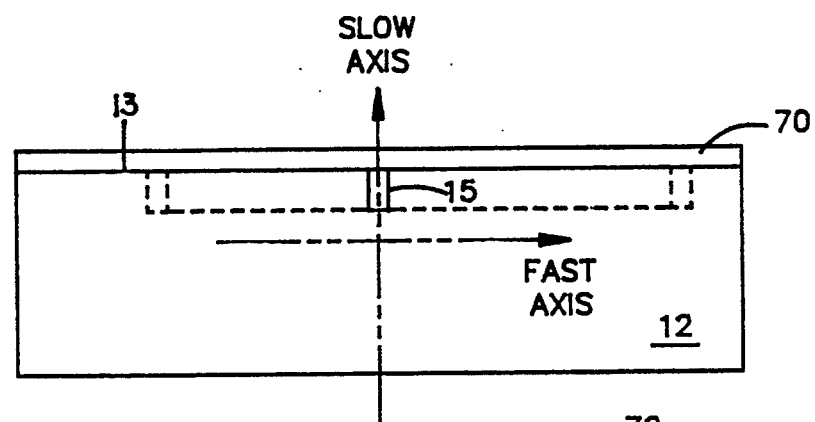
FIGS. 12a–12e is a second flow chart of the steps in the invention method.

FIG. 12a provides the first step in an alternative embodiment of the invention method step "A". FIG. 12a shows that the substrate is initially coated with a thin layer of metal 70 before the ablation process is commenced. The ends of the fiber are also initially coated with a metal coating compatible with the solder or fusion material to be used for affixing the fiber into the channel to be formed. The thin layer of metal 70 covers the substrate top surface 13 and extends beyond the surface of the channel or slot 14 or ledge 66 to be micro machined. The ablation process removes the metal covering the channel or slot 14 to be machined.

Figure 12B:
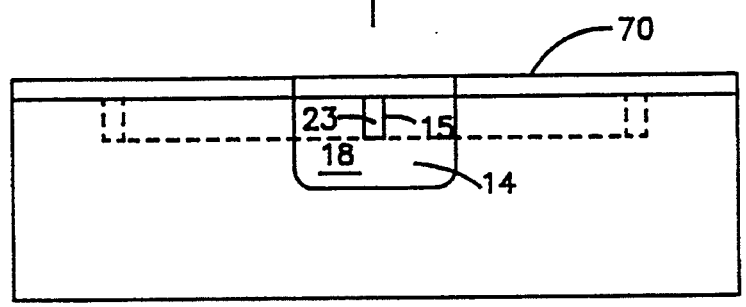
Figure 12C:
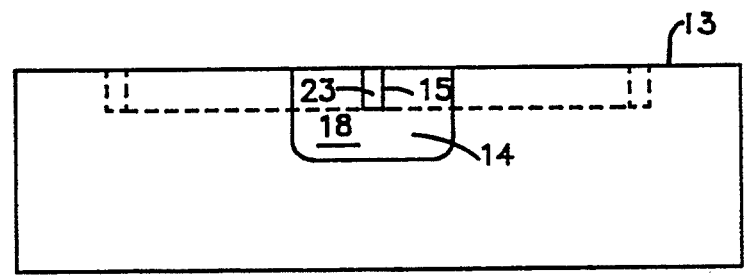
Figure 12D:
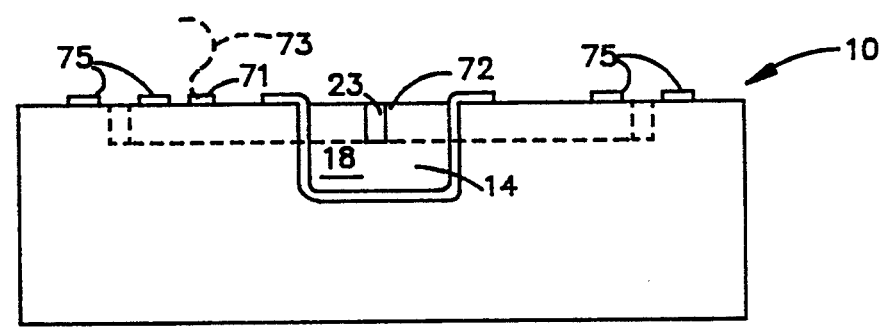

FIG. 12b shows the result of micro machining channel 14 into the substrate. The end surface 23 of the optical waveguide 15 is exposed.

FIG. 12b shows that the thin layer of metal 70 covering the surface of the substrate adjacent to the channel to be micro machined remains subsequent to the ablation process and enhances the sharpness of the margins of the channel being micro machined by rapidly dissipating heat at the margins of the channel or slot 14 horizontally and outward through the thin layer of metal thereby preventing the substrate material at the margin wall of the channel at the surface of the crystal substrate from melting.

The thin layer of metal 70 is believed to provide an improved thermal path for moving heat away from the margins of the channel being micro machined making it possible to machine the margins of the channel with greater precision. The thin layer of metal 70 is applied to the substrate top surface 13 by using vacuum deposition, or other conventional process. The thin metal layer 70 layer comprises a first or bottom layer of chromium and a second or top layer of gold.

In a detailed embodiment of the invention method, steps "B" of inserting the optical fiber into the slot, and step "C" of fixing the end of the optical fiber into the slot are expanded to include the steps of pre polishing the end face 25 of the first optical fiber 20 on the end portion of the fiber to form a substantially flat polished end surface, the end face angle 29 of the optical fiber also being formed; aligning the polished end face 25 of the first optical fiber 20 to be substantially co-parallel with the end wall 18; and, rotating the end portion of the first optical fiber 20 in the slot 14 to align the polarization axis of the first optical fiber 20 with the polarization axis of the first optical waveguide 15.

In yet another alternative embodiment, the step of abutting the end face 25 of the first optical fiber 20 against the end wall 18 to align and abut the end face against the end surface 23 of the optical waveguide 15 further comprises the step of filling any space between the end face 25 of the optical fiber 20, the end face of the core 24, and the end surface 23 of the first optical waveguide 15 with an optically matching media such as optical epoxy to match the index of refraction of the core 24 to the first optical waveguide 15 across the interface 38 to minimize losses.

In another embodiment, the step of fixing the end portion of the first optic fiber 20 into slot 14 is expanded to include the added steps of bonding the end portion of a fiber optic fiber into the channel or slot or ledge of predetermined length by: first, filling the channel with wet optical epoxy; second, positioning the end portion of the first optical fiber 20 into the wet epoxy filled channel; and third, curing the optical epoxy with the end portion of the fiber optic fiber fixed therein.

Figure 12E:
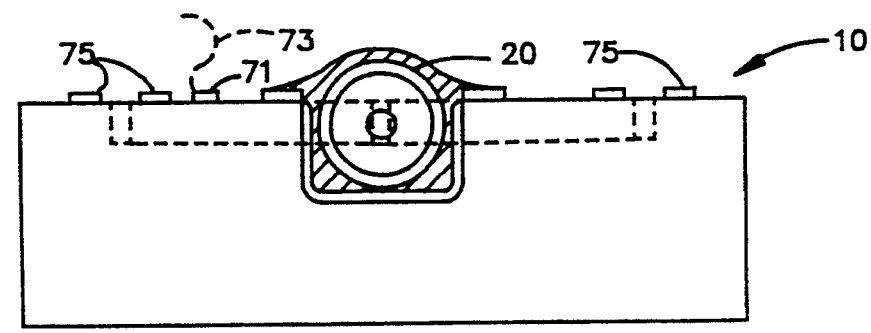

FIG. 12e shows another alternative embodiment of the step of fixing the end portion of the first optical fiber 20 into the slot 14. The method is expanded to include the added steps of: first, coating the interior of the channel and the exterior of the end portion of the first optical fiber 20 with a layer of chromium followed by a layer of gold by vapor deposition; second, bonding the end portion of a chromium and gold coated fiber optic fiber into the gold coated channel of predetermined length by: first, positioning the end portion of the fiber optic fiber into the filled channel; and second, soldering the end portion of the fiber optic fiber into the channel with a low temperature solder such as indium. A laser welding technique is also useable for locally melting or fusing the materials.

The solder mounting method uses a BSO type of solder. With the BSO solder, the surfaces of the substrate and the fiber so not have to be pre-coated. To use conventional solder, such as indium, the surface of the fiber and the surface of the trench in the substrate have to be coated.

Another embodiment of the invention for making an integrated optics device having a substrate 12 formed of an optically active material with a slot 14 formed therein such as that described above includes the steps comprising:

A. Applying a mask to the surface of the substrate to expose a predetermined region on the flat surface of the substrate in which a slot is to be formed. The mask exposes the surface of the substrate to define the parallel walls of the slot and the end wall 18. The slot is formed with a depth sufficient to position the central longitudinal or optical axis of the optical fiber to be placed in the slot such that the optical axis terminates at the end wall 18. The end wall 18 is finished to be substantially flat and to expose the end surface of the optical wave guide 23 on the end wall 18. The optical axis of the optical waveguide substantially intercepts the slot optical axis at the surface of the end wall.

B. Removing the material of the substrate from the slot to be formed by ablating the material of the substrate from the slot by exposing the masked surface of the substrate to an Excimer Laser pulsed energy beam. The Excimer Laser pulsed energy beam has a wavelength selected to be in the range of 248 nano meters to 308 nano meters. The laser beam ablates the surface of the single crystal lithium niobate ($LiNbO_3$) substrate exposed to the pulsed energy beam via void regions in the mask.

C. Positioning the end of the fiber optic fiber into the slot. The slot has a predetermined length and depth characterized by voids in the mask to substantially align the core optical axis with the slot optical axis and the optical axis of the waveguide 15.

D. Positioning the exposed core surface centrally against the exposed waveguide surface to obtain a predetermined optical coupling.

E. Bonding the end of the fiber optic fiber 20 in the slot.

Figure 11:
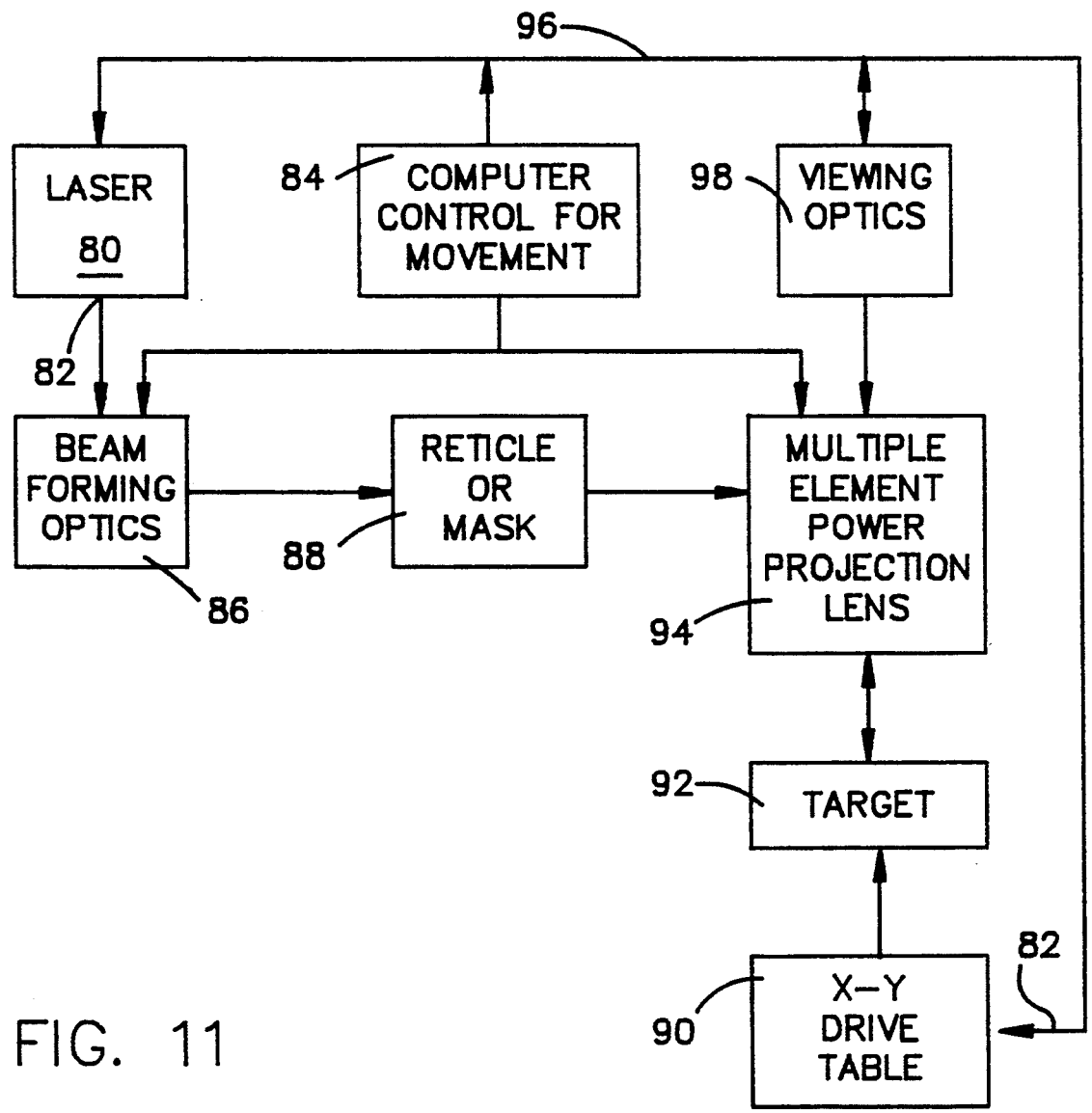
FIG. 11 is a first flow chart of the steps in the invention method.

FIG. 11 is a block diagram of a micro-machining system using an Excimer Laser. The EXCIMER Lasers used in the typical Micro-Machining System, such as those sold by IMS (Image Micro Systems, Inc.) at Billercia, Mass., 01821 are obtained from several sources including, Lunamics or Lambda Physick. It is believed that LUNAMICS is the dominant supplier with about 70% of the Laser market for Lasers of this type.

Block 80 represents the laser source. The laser source 70 within an IMS system is designed to flood an aperture 82 with the pulsed energy from the laser. The aperture 82 is designed to be smaller than the laser beam diameter which is typically 14 millimeters out of the laser source 80. The aperture 82 is sized to deliver a fairly uniform density of energy out of the port area (not shown) of the aperture. In an embodiment of the invention, XeCl is ionized to provide a beam with photons at a wavelength at 308 nm and 4.0 eV energy.

The laser source 80 is typically controllable via signals through an RS 232 Bus from the computer control 84 for movement. The lasers are integrated into the IMS system which provides the controls, displays, specimen table and X-Y drive electronics, apertures and reduction optics.

The aperture 82 directs the beam with uniform density to beam forming optics 86 for further adjustment of the beam density. The beam forming optics might be typically be a Wynne-Dyson 1X projection lens.

The laser beam is directed from the beam forming optics 86 to reticle or mask 88. Reticle or mask 88 is an oversized mask that is designed to define the pattern to be etched or to define an individual feature of the pattern to be etched. The mask aperture might be a simple slot such as a slot 14 that can be used to ablate multiple areas on the substrate by moving the substrate in relation to the EXCIMER beam by controlling the X-Y Drive Table 90 on which the target 92 (substrate) is mounted. The EXCIMER beam is then directed through a multiple element, adjustable power projection lens 94 that reduces the size of the image beam striking the surface of the target 92.

In the alternative, the process could start by forming a metal layer mask of chromium and gold on the surface of the substrate using conventional photolithographic techniques. The mask thus formed would define all details of the patterns to be ablated. The substrate would be held in a fixed location. The Micro Machining System would then be used to apply an EXCIMER beam to the mask and exposed surfaces of the substrate.

In the alternative, the mask on the surface of the substrate might be a thin layer of metal applied using vacuum deposition methods. The desired regions for slots would then be defined as void regions in the metal surface by using conventional photolithographic and chemical etching techniques to create the desired pattern in the metal layer. The area to be ablated would be limited by the aperture size of the EXCIMER laser beam. The size of the pattern to be ablated would be limited to the aperture size of the beam available with a uniform power density. The pattern is then milled by flooding the surface of the mask with the light beam; the substrate material at the exposed region of the mask being removed by ablation.

Referring again to FIG. 11, the enlarged reticle or mask 88, when used in the direct writing process, is typically many times the size of the pattern desired. X-Y Drive Table 90 is driven by an X-Y coordinated drive system by computer control 84 via control bus 96. The pattern to be transferred to the substrate can be etched using direct writing techniques by sending X-Y drive commands to the X-Y Drive table 90 from computer control 84. Viewing optics 98 enables the operator to adjust the pulse repetition rate and energy and slew rates of the table to best control the ablation process.

The beam power density is controlled by the operator by monitoring a power meter in the system.

A very sharp beam profile is directed to the exposed areas since the wave length is short thus since the diffraction is very small.

A typical Micro-Machining System is capable of delivering pulses at several wavelengths such as 193, 248 and 308 nanometers depending on the laser that is available in the system. The energy is delivered in pulses at a PRF rate that typically continuously variable between 1 and 400 pulses per second. As stated, the diameter of the laser beam in some commercially available machines is typically 14 mm. Typical pulse energy levels range from 200 mJ for operation at 193 nanometers; to 300 mJ for operation at 248 nanometers and to 200 mJ for operation at 308 nanometers.

The energy that passes through mask 88 is focused by multiple element power projection lens 94 capable of a reduction of 36 power to form an image on the target 92 workspace to be micro-machined. If a square aperture is used, the optics are capable of focusing a square image on the workspace having a side dimension that is continuously variable between 1 micro meter and 500 micro meter.

Figure 13:
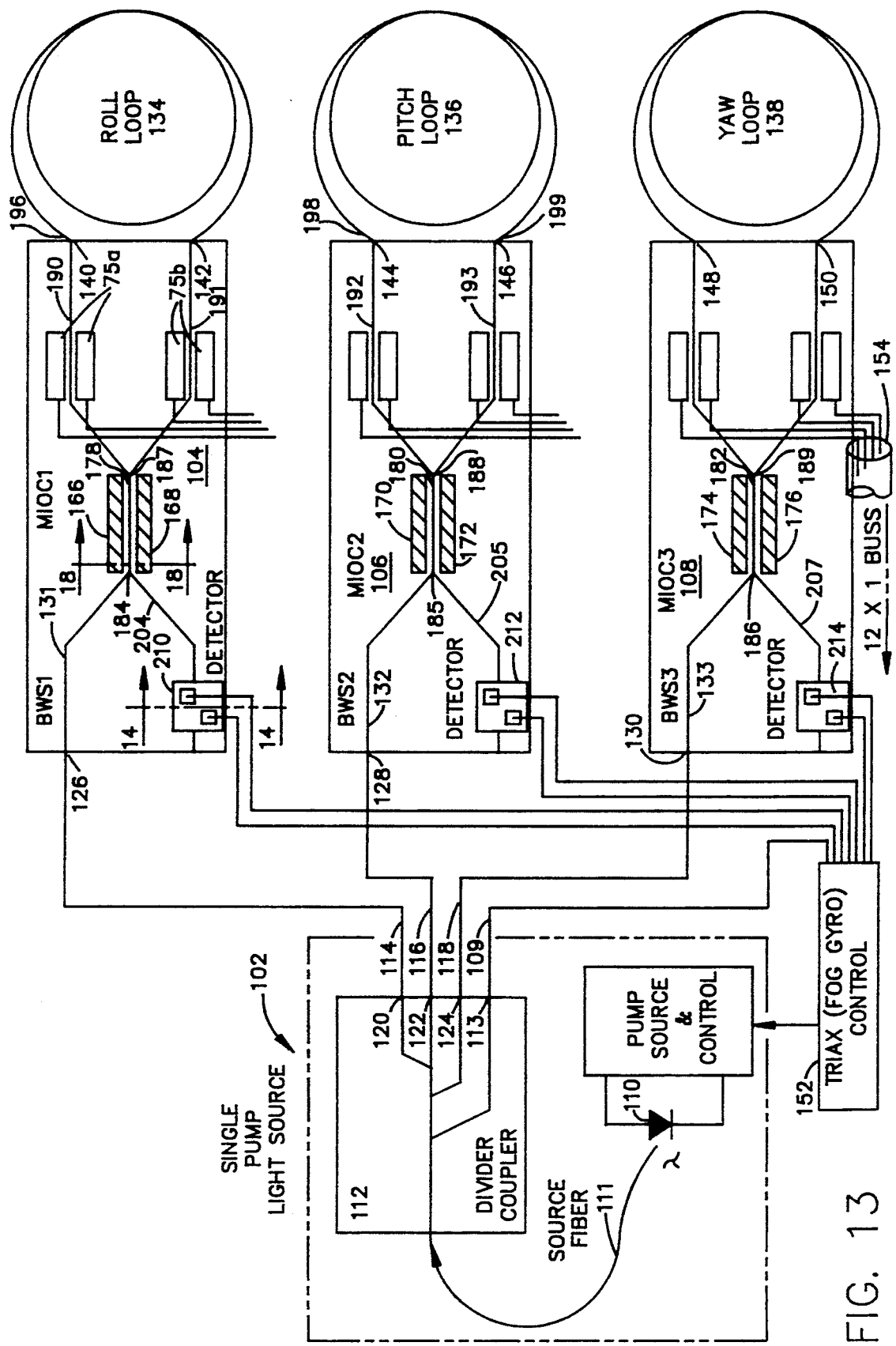
FIG. 13 is a schematic of a FOG TRIAX using three Y—Y MIOC devices (integrated optics chips) servicing three respective fiber optic sense loops.

FIG. 13 shows a typical triax arrangement of FOGs (Fiber Optic Gyros) using a single pump light source 102 and three double Y MIOC (multifunction integrated optics chip) devices, such as first, second and third double Y MIOC devices 104, 106 and 108. The double Y MIOC waveguide pattern on double Y MIOC devices 104, 106 and 108 represent an extension of the single Y configuration disclosed in connection with the Y pattern on substrate 12 in FIG. 1. Referring again to FIG. 13, each double Y MIOC receives light from the single pump light source 102. The pump light source has a diode source 110 that provides light via source fiber 111 to power divider coupler 112 to first, second and third input fibers 114, 116 and 118. Fibers 114, 116 and 118 couple light from the power divider coupler output ports 120, 122, 124 to the first, second and third input ports 126, 128, 130 of the three MIOC devices. Fiber 114 represents a source fiber that has one end seated in a first slot and that couples light from the light source to the first doped input waveguide 131;

Each double Y MIOC chip is typically 40 mm in length at the present time. First, second and third doped input waveguides 131, 132 and 133 are doped with erbium to form broadband waveguide sources. Erbium ions are doped into the single crystal lithium niobate (LiNbO$_3$O) substrate through the use of thermal diffusion and or ion implantation. The erbium concentration ranges from a few tens of a ppm to a few thousands of ppm. The doped waveguide is typically 5 microns wide and 4 microns deep. The waveguides can be doped with titanium using diffusion and the proton exchange process can be used to improve their performance. The proton exchange method that makes the respective waveguide polarizing waveguides. The waveguides thus formed represent a means for controlling the polarization of light guided by the optical waveguides.

The modulation plates 75a and 75b represent a means for modulating the phase of light guided by the optical waveguides. The drive signal for the respective modulating plates is provided by the TRIAX CONTROL 152 via 12×1 buss 154.

The detectors such as 210 and the TRIAX CONTROL represent a detector and signal processing means for detecting the interference of light waves that combine in the sense junction 187 and which process the detected signals to determine the rotation rate of the optical fiber sensing coil 134.

It may be possible to integrate all three MIOC devices into a single substrate in the future. At present single double Y devices are made to obtain higher yields than would be possible if three double Y devices were to be formed on a single chip or substrate. First, second and third rotation sensing coils 132, 134 and 136 respectively receive counter-rotating light beams from the first, second and third MIOC first and second output ports 140, 142, 144, 146 148 and 150 respectively. The FOG Gyros in the triax of FIG. 13 each use a double Y MIOC and employ adjacent barrier trenches 166, 168, . . . 176 on the flanks of the first, second and third MIOC center waveguide segments 178, 180 and 182.

Light from the first, second and third doped wave guides 131, 132 and 133, the input waveguides, is coupled via short waveguide segments from the distal end wall of a first slot extending from the edge of the substrate to input junctions 184, 185 and 186 respectively to the input ends of the first, second and third MIOC center waveguide segments 178, 180 and 182.

The output ends of the first, second and third MIOC center waveguide segments 178, 180 and 182 are connected to respective first second and third sense junctions 187, 188 and 189 where the source light divides between respective first and second sense waveguides in each of a first, second and third sense waveguide pairs 190, 191; 192, 193; 194, 195. The first and second ends 196, 197; 198, 199; 200, 201 of each respective roll, pitch and yaw fiber sensing coils 134, 136 and 138 are mounted in the slots at respective first, second and third MIOC sense ports 140, 142; 144, 146; 148 and 150 so that the ends of the optical fiber sensing coils are butt-coupled to the corresponding waveguides.

Light from each respective broad band source 131, 132, 133 therefore exits the waveguides 190, 191; 192, 193; 194, 195 14 and 15 and enters the ends 196 . . . 201 respectively, of the roll, pitch and yaw optical fiber sensing coil 134, 136 138 41 to form the two counter-propagating waves in each respective sensing coil that are required for detection of rotation by means of the Sagnac effect. As seen in FIG. 13, the light input to the end 197 of the roll fiber sensing coil 134 forms the counterclockwise wave and the light input to the end 196 forms the clockwise wave.

By way of example, the counterpropagating waves travel through the roll loop coil 134 and experience a phase shift if the roll loop optical sensing coil 134 is rotating about a line perpendicular to the plane of the coil. The clockwise wave then enters the first sense of the first sense waveguide pair 190, and the counterclockwise wave enters the second sense of the first sense waveguide pair 191.

The phase shifted waves then propagate to the first sense junction 187 where they combine to form an interference pattern. The first MIOC center waveguide segment 178 couples the combined waves to the first input junction 184. The combined beams are then split with a portion of the light being directed into first output waveguide 204. The first output waveguide represents a detector that extends from the to a detector such as detector 210.

The first second and third sense wave guides each couple a portion of the combined beam to respective roll, pitch and yaw detectors 210, 212 and 214 to form interference patterns on respective detectors, to provide detected roll, pitch and yaw signals. The detected roll, pitch and yaw signals are then coupled to the triax control 152 in which signal processing circuitry then determines the rotation rate of the roll, pitch and yaw loop rotation sensing coils 134, 136 and 138 respectively. Each optical fiber sensing coil has a first and second end. Each end of the sensing coil has end face. The end face of the optical fiber is formed at an end face angle with the direction of the propagation of light in the optical fiber to reduce the amount of light reflected at the end face of the optical fiber.

Each end of each optical fiber sensing coil fits into a second and third slot. Each slot extends from a separate location, i.e. 140, 142 at the edge of the substrate to a distal end wall (not shown) to expose an end surface of a respective sense waveguide, 190, 191. Each second and third slot within the substrate is formed to receive an end of the optical fiber sensing coil 134. Each respective end is positioned in a respective slot with the end face of the optical fiber being butt-coupled to the end surface of the optical waveguide to form an interface such that light may propagate between the optical sense waveguide 190, 191 and the optical fiber, i.e. roll loop 134.

Barrier trenches 166, 168 . . . 176 are used to eliminate bias errors inherent in the gyro from non reciprocal effects. The trenches are formed using the invention ablation method. In a FOG operating with a broad band source at approximately 1.55 um, the depth of the trenches will be 10–20 um and the width of the trench is 10–15 um. The wall thickness between the side of the trench and the nearest waveguide wall is typically 2 um. The purpose of the trenches is to stop the light from entering the region on either side of the center waveguides 178, 180, 182 by blocking further passage of the light with the trenches. The trench is either filled with a light absorbing media such as wax or allowed to remain as a void space. Use of the trenches may attenuate the bias effect by 30–40 db.

Figure 15:
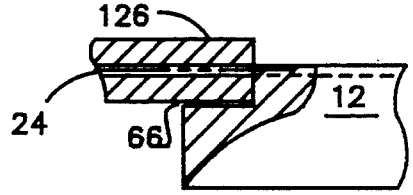
FIG. 15 is an expanded partial section partial elevation of FIG. 14 taken on section line 15—15 in FIG. 14.

FIG. 14 is a plan view of the input end of an MIOC such as MIOC1 modified to show an exagerated fiber 126 mounted on ledge 216 and aligned to abut the end of the optical fiber core against waveguide 131. FIG. 15 is an expanded partial section partial elevation of FIG. 14 that shows the core 24 aligned with the waveguide 131. The surface of the waveguide and the face of the fiber are finished to reduce reflections in accordance with the above discussion of FIGS. 3 and 8. Use of a ledge 216 in place of a trench or channel provides for reduced tolerances and therefore easier alignment of the core with the waveguide 131.

FIG. 16 is a partial sectional view of FIG. 14 taken on section line 16—16 through detector 210. Roll detector 210 is typically a surface mounted pin diode chip or it may be packaged with self optics at its base with a powered pre-amp or it might be a die simply bonded to the surface of the waveguide 131 as shown. The roll detector shown has N region 218, intrinsic region 219 and P region 220. Leads are shown connected to contacts 222 and 224. The surface of the exposed waveguide past the roll detector would be finished with a light absorbing surface to avoid reflections.

FIG. 17 shows an alternative mounting arrangement for the roll detector 210 on ledge 216. The depth of the ledge 216 is predetermined to align the core of the fiber with the waveguide and the intrinsic region of the detector with waveguide.

Figure 18:
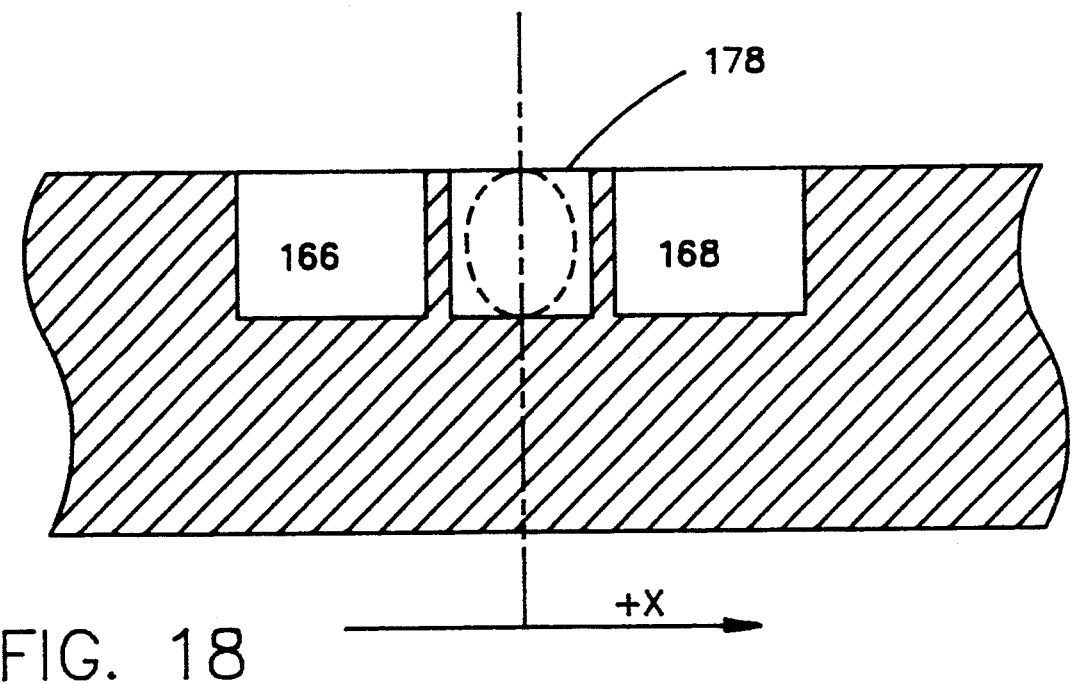
FIG. 18 is a partial sectional view of MIOC1 in FIG. 13 taken on section line 18—18 to show the relationship of the waveguide 178 with the first MIOC first and second barrier trenches.
Figure 19A:
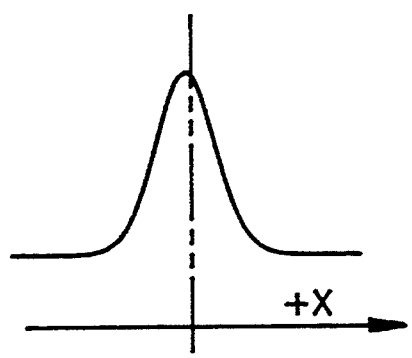
FIG. 19a schematically shows the relative amplitude of the light as a function of the distance across the cross section of the center waveguide.
Figure 19B:
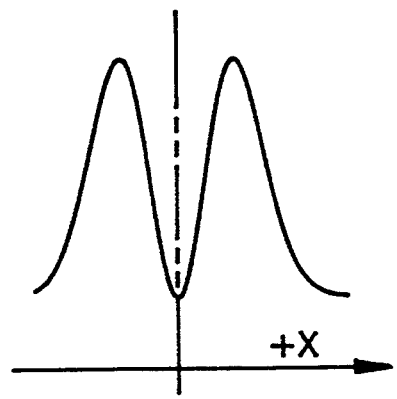
FIG. 19b schematically shows the relative amplitude of dual mode light in the center waveguide as a function of distance across the cross section of the center waveguide.

FIG. 18 is a partial sectional view of MIOC1 in FIG. 13 taken on section line 18—18 to show the relationship of the waveguide 178 with the first MIOC first and second barrier trenches 166, 168. The dotted ellipse central to the section of waveguide 178 indicates that the light within the waveguide is single mode light. FIG. 19a schematically shows the relative amplitude of the light as a function of the distance across the cross section of the waveguide. The presence of the first MIOC first and second barrier trenches 166, 168 precludes the passage of dual mode light mode such as that illustrated in FIG. 19b. Light is prevented from passing into the substrate and forming a second mode by the blocking action of the trenches on adjacent sides of the waveguide 178.

The structures and methods disclosed herein illustrate the principles of the present invention. The invention may be embodied in other specific forms without departing from its spirit or essential characteristics. Therefore, the described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for making an integrated optics device having a crystal substrate formed of an optically active material having a crystal lattice, said crystal substrate having at least one slot formed therein, and at least one optical waveguide delineated within the crystal substrate to guide optical signals along a selected optical axis of propagation, the slot having a distal end wall, the distal end wall of the slot exposing an end surface of the optical waveguide, the optical waveguide having an optical axis, the end surface of the optical waveguide being formed at an angle with the optical axis of propagation to reduce the amount of light reflected at the end surface of the optical waveguide; said integrated optics device having at least one optical fiber positioned in said slot, said optical fiber having a core, said optical fiber having an end face with the core having an end face exposed on the surface of the optical fiber end face, the method steps comprising:

A. micro machining a slot of predetermined length, depth and width into the surface of the crystal substrate by scanning the surface path of the slot to be micro machined with a focused beam of photons, the wavelength of the photons and the beam density being selected to ablate molecules from the crystal lattice; the slot terminating at a slot end wall, the slot end wall containing a waveguide end surface;

B. positioning the end portion of the optical fiber into the slot, the slot predetermined length and depth being characterized to coaxially align and abut the end face of the core with the waveguide end surface;

C. fixing the end portion of the optical fiber into the slot with end face of the core substantially abutting the waveguide end surface.

2. The method of claim 1 wherein the step of micro machining first comprises the step of adjusting the wavelength of the photons and the spot size, pulse rate and pulse density and scan rate of the focused beam containing the photons to achieve ablation substantially free of melting of the crystal substrate to the predetermined depth along the predetermined path of the slot to be formed.

3. The method of claim 1 wherein the step of scanning the surface path of the slot to be micro machined further comprises the step of:

coating the substrate with a thin layer of metal before ablation, the metal covering the surface of the slot to be micro machined being removed by ablation, the metal covering the surface of the substrate adjacent to the slot to be micro machined remaining and enhancing the sharpness of the margins of the slot being micro machined by preventing the substrate material at the margin wall of the slot at the surface of the crystal substrate from melting by providing an improved thermal path for moving heat away from the margins of the slot being micro machined.

4. The method of claim 1 wherein said optical fiber and said optical waveguide are each further characterized to have a respective polarization axis and wherein fixing the end portion of the optical fiber to the optical waveguide end surface further comprises the steps of:

rotating the end portion of the fiber in the slot to align the polarization axis of the fiber with the polarization axis of the optical waveguide.

5. The method of claim 1 wherein said optical fiber and said optical waveguide are each further characterized to have a respective polarization axis and wherein fixing the end portion of the optical fiber to the optical waveguide end surface further comprises the steps of:

polishing the end face of the core in the end portion of the optical fiber to form a substantially flat polished end surface;

aligning the polished end surface of the fiber to be substantially co-parallel with the waveguide end wall; and, rotating the end portion of the fiber in the slot to align the polarization axis of the fiber with the polarization axis of the optical waveguide.

6. The method of claim 1 wherein the step of fixing the end portion of the optical fiber into the waveguide end surface further comprises the step of:

filling any space between the end face of the core and the waveguide end surface with an optically matching media.

7. The method of claim 6 wherein the step of filling any space between the end face of the core and the waveguide end surface with an optically matching media further comprises the step of:

filling the space between the end face of the core and the waveguide end surface with optical epoxy.

8. The method of claim 6 wherein the step of fixing the end portion of the optical fiber into the waveguide end surface further comprises the step of:

bonding the end portion of a optical fiber into the slot of predetermined length by:

filling the slot with optical epoxy;

positioning the end portion of the optical fiber into the filled slot; and curing the optical epoxy with the end portion of the optical fiber fixed therein.

9. The method of claim 6 wherein the step of fixing the end portion of the optical fiber into the waveguide end surface further comprises the step of:

coating the interior of the slot and the exterior of the end portion of the optical fiber with gold by vapor deposition;

bonding the end portion of the gold coated optical fiber into the gold coated slot of predetermined length by:

positioning the end portion of the optical fiber into the filled slot; and soldering the end portion of the optical fiber into the slot with a low temperature solder.

10. A method for making an integrated optics device having a crystal substrate formed of an optically active material having a crystal lattice, said crystal substrate having at least one ledge formed therein, and at least one optical waveguide delineated within the crystal substrate, the ledge having a distal end wall, the optical waveguide having an optical axis, the integrated optics device also having an optical fiber having a core, said optical fiber having an end face with the core having an end face exposed on the surface of the optical fiber end face, the method steps comprising:

A. micro machining a ledge of predetermined length, depth and width into the surface of the crystal substrate by scanning the surface path of the ledge to be micro machined with a focused beam of photons, the wavelength of the photons and the beam density being selected to ablate molecules from the crystal lattice; the ledge terminating at a ledge end wall, the ledge end wall exposing a waveguide end surface, the ledge end wall being formed at an angle with the optical axis of the waveguide to form the waveguide end surface at an end surface angle with the optical axis of propagation;

B. positioning the end portion of the optical fiber on the ledge, the ledge length and depth being characterized to aid in aligning the end face of the core with the waveguide end surface;

C. fixing the end portion of the optical fiber onto the ledge with the end face of the core substantially abutting the waveguide end surface.

11. The method of claim 10 wherein said optical fiber and said optical waveguide are each further characterized to have a respective polarization axis and wherein the step of fixing the end portion of the fiber optic fiber to the optical wave-guide end face further comprises the steps of:

polishing the end face of the core in the end portion of the fiber to form a substantially flat polished end surface;

aligning the polished end surface of the fiber to be substantially co-parallel with the end wall; and, rotating the end portion of the fiber on the ledge to align the polarization axis of the fiber with the polarization axis of the optical waveguide.

12. The method of claim 10 wherein before the step of positioning the end portion of the optical fiber on the ledge, the end face of the optical fiber is formed at an end face angle with the direction of the propagation of light in the optical fiber to reduce the amount of light reflected at the end face of the optical fiber.

13. The method of claim 10 wherein the step of micro machining a ledge of predetermined length, depth and width into the surface of the crystal substrate the end surface of the optical waveguide is performed to form the end surface of the optical waveguide with an end surface angle with the optical axis of propagation to reduce the amount of light reflected at the end surface of the optical waveguide.

14. The method of claim 10 wherein before the step of positioning the end portion of the optical fiber on the ledge, the end face of the optical fiber is formed at an end face angle with the direction of the propagation of light in the optical fiber to reduce the amount of light reflected at the end face of the optical fiber; and, the step of micro machining a ledge of predetermined length, depth and width into the surface of the crystal substrate to form the end surface of the optical waveguide is performed to form the end surface of the optical waveguide with an end surface angle with the optical axis of propagation to reduce the amount of light reflected at the end surface of the optical waveguide.

15. The method of claim 10 wherein said optical fiber and said optical waveguide are each further characterized to have a respective polarization axis and wherein the step of fixing the end portion of the fiber optic fiber to the optical wave-guide end face further comprises the steps of:

rotating the end portion of the fiber on the ledge to align the polarization axis of the fiber with the polarization axis of the optical waveguide.

16. The method of claim 10 wherein the step of micro machining first comprises the step of adjusting the wavelength of the photons and the spot size, pulse rate and pulse density and scan rate of the focused beam containing the photons to achieve ablation substantially free of melting of the crystal substrate to the predetermined depth along the predetermined path of the slot to be formed.

17. The method of claim 10 wherein the step of scanning the surface path of the ledge to be micro machined further comprises the step of:

coating the substrate with a thin layer of metal before micro machining, the metal delineating the surface of the ledge to be micro machined being removed to expose the surface of the crystal substrate, the metal covering the surface of the substrate adjacent to the ledge to be micro machined remaining and enhancing the sharpness of the margin of the ledge being micro machined.

18. The method of claim 10 wherein the step of fixing the end portion of the fiber optic fiber onto the ledge to substantially abut the waveguide end surface waveguide end face further comprises the step of:

filling any space between the end face of the core and the waveguide end face with an optically matching media.

19. The method of claim 18 wherein the step of filling any space between the end face of the core and the waveguide end face with an optically matching media further comprises the step of:

filling the space between the end face of the core and the waveguide end face with optical epoxy.

20. The method of claim 10 wherein the step of fixing the end portion of the fiber optic fiber onto the ledge to abut the end face of the core against the optical waveguide end face further comprises the step of:

bonding the end portion of a fiber optic fiber onto the ledge by:

covering the end portion of the fiber optic fiber with optical epoxy;

positioning the end portion of the fiber optic fiber onto the ledge; and curing the optical epoxy with the end portion of the fiber optic fiber fixed thereon.

21. The method of claim 20 wherein the step of fixing the end portion of the fiber optic onto the ledge to abut the end portion of the fiber optic the waveguide end face further comprises the step of:

coating the surface of the ledge and the exterior of the end portion of the fiber optic fiber with a solderable metal by vapor deposition;

bonding the end portion of the solderable metal coated fiber optic fiber onto the solderable metal coated ledge of predetermined length after:

positioning the end portion of the fiber optic fiber onto the solderable metal coated ledge; and soldering the end portion of the fiber optic fiber onto the ledge with a low temperature solder.

22. A method for making an integrated optics device having a crystal substrate formed of an optically active material having a crystal lattice, said crystal substrate having at least one ledge formed therein, and at least one optical waveguide delineated within the crystal substrate to guide optical signals along a selected optical axis of propagation, the ledge having a distal end wall, the distal end wall of the ledge exposing an end surface of the optical waveguide, the optical waveguide having an optical axis, said integrated optics device having at least one optical fiber positioned on the ledge, said optical fiber having a core, said optical fiber having an end face with the core having an end face exposed on the surface of the optical fiber end face, the method steps comprising:

A. micro machining a ledge of predetermined, length, depth and width into the surface of the crystal substrate by scanning the surface path of the ledge to be micro machined with a focused beam of photons, the wavelength of the photons and the beam density being selected to ablate molecules from the crystal lattice; the ledge terminating at a ledge end wall, the ledge end wall exposing an end surface of the optical waveguide, the ledge length and depth being characterized to coaxially align and abut the end face of the core with the end surface of the optical waveguide; the end surface of the optical waveguide being formed at an angle with the optical axis of propagation to reduce the amount of light reflected at the end surface of the optical waveguide;

B. positioning the end portion of the optical fiber onto the ledge;

C. aligning the end face of the core with the end surface of the optical waveguide;

D. fixing the end portion of the optical fiber onto the ledge with the end face of the core substantially abutting the waveguide end surface.

* * * * *